United States Patent
Mäkelä et al.

(10) Patent No.: US 6,501,967 B1
(45) Date of Patent: Dec. 31, 2002

(54) DEFINING OF A TELEPHONE'S RINGING TONE

(75) Inventors: Jarmo Mäkelä, Tampere (FI); Heikki Särkkä, Tampere (FI); Sakari Pelkonen, Oulu (FI); Juha Sippola, Oulu (FI); Jani Leppälammi, Pirkkala (FI)

(73) Assignee: Nokia Mobile Phones, Ltd., Espoo (FI)

( * ) Notice: Subject to any disclaimer, the term of this patent is extended or adjusted under 35 U.S.C. 154(b) by 849 days.

(21) Appl. No.: 08/803,355

(22) Filed: Feb. 20, 1997

(30) Foreign Application Priority Data

Feb. 23, 1996 (FI) ................................... 960858

(51) Int. Cl.$^7$ .............................. H04B 1/38; H04M 1/00
(52) U.S. Cl. ................... 455/567; 379/374.01; 455/550
(58) Field of Search ................................ 379/372, 373, 379/374, 67.1, 68, 375, 179, 180, 181, 185; 455/550, 567, 412, 414, 566, 575; 84/611, 612, 613, 614, 615

(56) References Cited

U.S. PATENT DOCUMENTS

| | | | | |
|---|---|---|---|---|
| 4,089,246 A | * | 5/1978 | Kooker | 84/470 R |
| 4,215,343 A | * | 7/1980 | Ejiri et al. | 345/27 |
| 4,368,989 A | * | 1/1983 | Kawashima | 368/74 |
| 4,378,720 A | * | 4/1983 | Nakada et al. | 84/611 |
| 4,475,013 A | * | 10/1984 | Lee et al. | 379/355 |
| 4,478,525 A | * | 10/1984 | Yamaguchi | 368/273 |
| 4,602,546 A | * | 7/1986 | Shinohara | 84/609 |
| 4,646,609 A | * | 3/1987 | Teruo et al. | 84/615 |
| 4,860,339 A | * | 8/1989 | D'Agosto, III et al. | 379/67 |
| 4,866,766 A | * | 9/1989 | Mitzlaff | 379/374 |
| 4,868,561 A | * | 9/1989 | Davis | 340/825.44 |
| 4,998,291 A | * | 3/1991 | Marui et al. | 455/563 |
| 5,046,004 A | * | 9/1991 | Tsumura et al. | 84/601 |
| 5,153,829 A | * | 10/1992 | Furuya et al. | 84/622 |
| 5,208,852 A | * | 5/1993 | Tamura et al. | 379/353 |
| 5,315,638 A | | 5/1994 | Mukari | 379/58 |
| 5,452,354 A | | 9/1995 | Kyronlahti et al. | 379/375 |
| 5,606,597 A | * | 2/1997 | Newland | 455/464 |
| 5,728,960 A | * | 3/1998 | Sitrick | 84/477 R |
| 6,094,587 A | * | 7/2000 | Armanto et al. | 379/373.03 |
| 6,366,791 B1 | * | 4/2002 | Lin et al. | 379/373.01 |

FOREIGN PATENT DOCUMENTS

| | | |
|---|---|---|
| EP | 0684591 A1 | 11/1995 |
| WO | WO 92/03891 | 3/1992 |

\* cited by examiner

*Primary Examiner*—Charles N. Appiah
(74) *Attorney, Agent, or Firm*—Perman & Green, LLP

(57) ABSTRACT

The present invention relates to a method for producing a ringing tone of a telephone and a telephone, which comprises a sound generator for generating the ringing tone as a response to an incoming call, a memory for storing a signal representing the ringing tone, means for retrieving the signal from the memory and for inputting the signal into the sound generator for generating the ringing tone, and sound reproduction means for reproducing the ringing tone generated by the sound generator. In the method, information defining the ringing tone is input as characters, each character defining both pitch and duration of a tone and stored in the memory of the telephone, for which the telephone comprises means for inputting information defining the ringing tone as characters, each character defining both pitch and duration of a tone. Thus, a desired melody is produced as the ringing tone. Notes can be produced on a stave displayed on a display of the telephone. A user can input the desired melody either by means of keys and a menu or by means of a combination of specific keys.

30 Claims, 4 Drawing Sheets

| DURATION | NOTE | RESET |
|----------|------|-------|
| 1/8 | ♪ | ɾ |
| 1/4 | ♩ | ⸘ |
| 1/2 | ♩ (half) | - |
| 1/1 | o | - |
| SHARP | ♭ | |
| FLAT | ♯ | |

FIG. 2A

DEFINING OF A TELEPHONE'S RINGING TONE

FIELD OF THE INVENTION

The present invention relates to a method and a telephone for producing a ringing tone for the telephone, wherein the ringing tone is stored in a memory of the telephone, as a response to an incoming call a signal representing the ringing tone is retrieved from the memory, the ringing tone is generated, and the ringing tone is reproduced by means of sound reproduction means of the telephone. The invention relates to a ringing tone of ordinary telephones and a ringing tone of different types of mobile stations.

BACKGROUND OF THE INVENTION

Mobile phones have originally had ringing tones similar to ordinary telephones, which have mainly resembled the ringing of a clock. When a mobile phone of a specific make and model had one fixed ringing tone problematic situations occurred, when two users in the same space had the same type of mobile phone and, thus, the same kind of ringing tone, in which case, it was confusing as to whose phone was actually ringing. This problem has been solved by making the ringing tone dependent on either the user's own telephone number or the telephone number of a caller. However, the ringing tones produced on the basis of two almost identical telephone numbers may sound so much alike, that it is difficult to separate them from each other. In addition, by producing a ringing tone on the basis of a telephone number, ringing sound effects with different tones are mainly achieved, however, tones produced only on this basis may even annoy the user, i.e., the user is not allowed to select a ringing tone to his/her liking.

This problem has been solved further as mobile phones have become more advanced. Currently, mobile phones normally have several pre-stored ringing tones from amongst which the user may select the preferred ringing tone. In addition to ordinary ringing tones, melodies from familiar pieces of music have been implemented as ringing tones by means of modern technology, and they are also amongst the ringing tones to choose from. With the enormous increase in the use of mobile phones, it has turned out that even as many as ten different ringing tones in a mobile phone are not enough to solve the problem of several mobile phone users thinking that it is their phone ringing, when someone else's phone is ringing. In addition, it may be that the user does not like any of the pre-stored ringing tones. Ordinary telephones, which have a limited number of different types of ringing tones, often present a similar problem.

The situation has been improved by solutions for programming ring tones with the user interface of the telephone or other communication device. One solution has been shown in U.S. Pat. No. 4,866,766 in which the user inputs different parameters defining a pulse formed ring tone sequence, such as frequency, pulse length, number of pulses in a group, length of interval between pulses, number of pulse groups etc. These parameters are input by the user as numbers. Another solution has been described in publication WO 92/03891, in which the ring tone of a pager can be programmed by lighting certain pixels of a matrix display. The location of a pixel vertically corresponds to a certain pitch (E, F, G, A, H, C, D) and the duration of a tone is determined by the amount of pixels in sequence horizontally. The drawback of this solution is that it is difficult for the user to differentiate the pitches since a pixel is very small on a matrix display and it is difficult to differentiate between to neighboring pitches. Also for adjusting the duration the user needs to input several pixels, which takes time. Another similar solution has been disclosed in publication EP 684 591 A1 in which a ring tone can be programmed on the display of a pager by defining pitches with two-letter definitions (DO, RE, MI, FA, SO, LA, TI) and the duration of a tone by the amount of similar definitions in sequence. The drawback of this solution as well is that for adjusting the duration the user needs to input several letters, which takes time and also consumes space on the display and makes it difficult to ensure that the right melody has been input.

SUMMARY OF THE INVENTION

The objective of the present invention is to avoid at least some of the aforementioned problems. This is possible by means of a telephone, which has means for inputting ringing tones as notes, i.e. as characters, whereby each character defines both pitch and duration of a tone. In this context, a telephone means an ordinary telephone, a mobile phone and some other type of mobile station, which comprises means for executing outgoing calls and for receiving incoming calls. The user can preferably produce, by means of a user interface, tones of the desired pitch and duration by means of notes and rests, the desired melody being produced by the sequence formed of them. The tunes and the melody can preferably be produced by means of a user interface, which comprises a display, and wherein a stave is produced for producing the melody, whereon the desired melody can be written by means of the user interface, and stored as the ringing tone of the telephone (mobile station). Tones, i.e., notes and rests, can be selected, e.g., from a note menu, and they can be placed in the desired place on the stave displayed on the display. As an alternative to the retrieving of a note from the menu, the tones can be produced through a keyboard of the mobile station, e.g., so that by pressing a specific key or by pressing two or more keys as a combination, a tone of a specific pitch is produced, and the duration of the tone is proportional to the duration of the press.

A telephone according to the present invention is characterised in that it comprises means for inputting information defining the ringing tone as characters, each character defining both pitch and duration of a tone. Correspondingly, a method according to the present invention is characterised in that information defining the ringing tone is input as characters, each character defining both pitch and duration of a tone and stored in the telephone's memory.

BRIEF DESCRIPTION OF THE DRAWINGS

In the following, the present invention will be discussed in detail by referring to the enclosed drawings, in which FIG. 2a illustrates notes produced on a display of a mobile station according to the present invention.

DETAILED DESCRIPTION

Figure 1A:
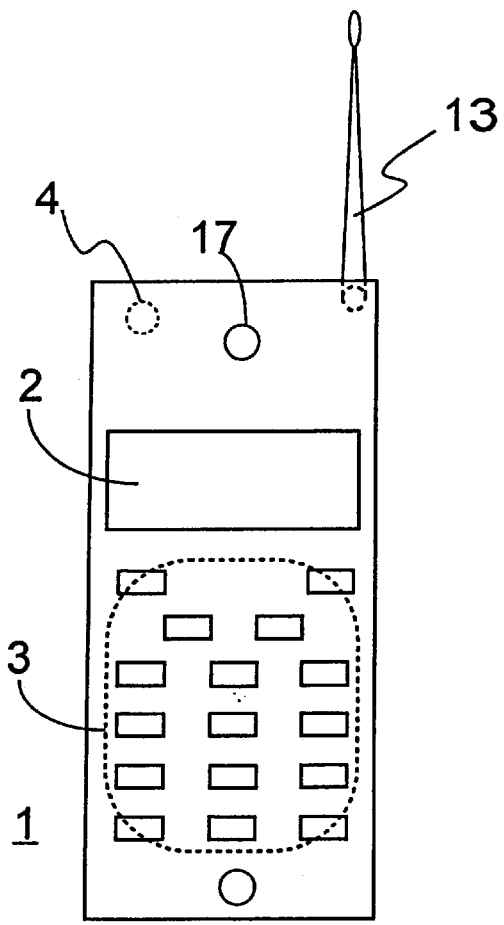
FIG. 1a illustrates a mobile phone having an ordinary user interface.
Figure 1B:
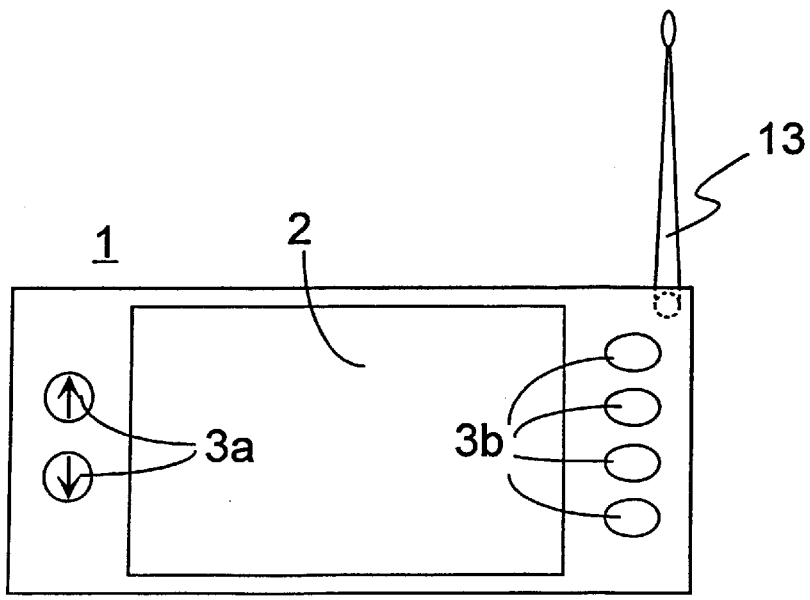
FIG. 1b illustrates a mobile phone having an extraordinary user interface.
Figure 2B:
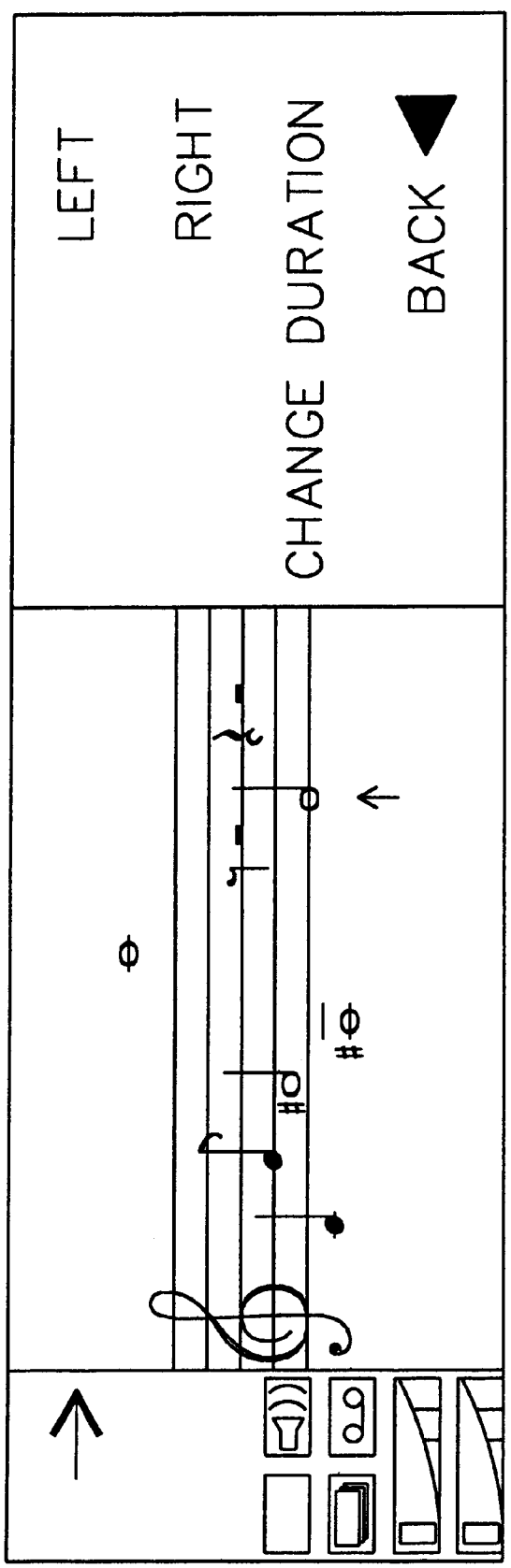
FIG. 2b illustrates a display of a mobile station for producing a ringing tone.

FIGS. 1a and 1b illustrate two examples of a user interface of a mobile station 1, according to the present invention, by means of which a user can produce the desired ringing tone melody. FIG. 1a illustrates an ordinary mobile phone, which has a display 2, a keyboard 3, and a speaker 17 for reproducing sounds. Mobile phones, as well as ordinary telephones, normally have another off-line sound reproducing device, such as a buzzer 4 for reproducing a ringing tone, in which case the speaker 17 is only used for reproducing speech. In a mobile phone, the buzzer 4 has often been placed under a cover, however, so that the ringing tone can be heard by the user. In a first embodiment of the invention, a stave is produced on the display 2 of the mobile station, whereon, by means of a menu (FIG. 2b) and keys 3; 3a, 3b, displayed on the display, desired notes can be selected and placed in the desired place on the stave, displayed on the display, by means of a cursor moved by means of keys (e.g., keys 3b in FIG. 1b according to the menu in FIG. 2b). FIG. 1b illustrates a mobile station having a larger display, on which it is easier to present the stave. Thus, the mobile station can be implemented by means of a user interface illustrated in FIG. 1b either alone or in addition to, e.g., an ordinary user interface illustrated in FIG. 1a. In the latter alternative, the mobile station can be a so-called communicator, whereto, in addition to ordinary mobile station characteristics, a data processing device has been integrated, which enables data processing, maintaining of an electronic notebook, sending of telefax messages and e-mail, and even a communications link to the Internet through mobile station communications. For data processing services, the communicator preferably has the same type of user interface as illustrated in FIG. 1b, by means of which the mobile station's ringing tone can be input as notes according to the present invention. In this type of communicator, there is a connection between the mobile station and data processing sections, in which case, by means of a user interface of the data processing section, a ringing tone can be input to be stored and used as the ringing tone of the mobile station section.

In this first embodiment, from the menu to be displayed on the display through keys, the desired clef can be selected and, always at the place indicated by a cursor, a note can be placed, the duration and pitch of which (i.e., the position on the stave) can be changed by means of the keys 3, 3a, 3b, and the menu. For example, to modify the duration of a note, a duration menu is accessed through the key 3b, wherein, through the browse key 3a, an eighth note, a quarter note, a half note or a whole note or, correspondingly, an eighth rest, a quarter rest, a half rest or a whole rest can be selected on the stave. These notes have been illustrated in FIG. 2a. Similarly, to modify the pitch of a note (the position of the note on the stave in the vertical direction), the position of the note on the stave can be raised by pressing the browse key 3a in one direction (the key pointing upwards), and the position of the note on the stave can be lowered by pressing the browse key 3a in the other direction (the key pointing downwards). In this way, it is possible to produce any desired melody, e.g., rest, c, d, e, f, g, a, h, $c^1$, $d^1$, $e^1$, $f^1$, $g^1$, $a^1$, $h^1$, $c^2$, $d^2$, $e^2$, $f^2$, $g^2$, $a^2$, or $h^2$. Sharp (cis, dis, eis, fis, gis, ais, his, $cis^1$, $dis^1$, ..., $cis^2$, $dis^2$, ..., $his^2$) and flat (ces, des, es, fes, ges, as, b, $ces^1$, $des^1$, ..., $ces^2$, $des^2$, ..., $b^2$) notes can also be produced through the browse key 3a, in which case on the display, in front of the note, a symbol indicating either a sharp or flat note is produced, and these have also been illustrated in FIG. 2a. In this way, it is possible to produce, on the stave, the desired notes and rests one after another, e.g., so that the melody has a maximum of 60 successive notes. An example of a display of a mobile station, when it is in a melody-producing mode, has been illustrated in FIG. 2b, which shows a stave, a clef, different notes, as well as a cursor (arrow), which indicates the place of the note, the length (duration) and pitch of which can be changed, in the same way as when selecting a note as presented above. On the stave, illustrated in FIG. 2b, the third note and the fourth note from the left are examples of sharp (raised) notes.

As an alternative to producing melodies on a stave by means of keys and a menu, the notes, in the first embodiment presented above, could be displayed as icons on the display, wherefrom they could be dragged and released (i.e., placed) in the desired place on the stave by means of a pointer moved by a so-called spin wheel or track ball. The use of the spin wheel or track ball could be avoided by using a touch display, in which case the icons in question could be placed on the stave by means of a finger or a pen.

In addition, by means of the user interface, a tempo could be set, e.g., beats per minute bpm, at which tempo the produced ringing tone (the melody written on the stave) is reproduced. In this case, the length of a fourth note in milliseconds is t=1000.60/tempo, in which case, if the tempo is 150 bpm, the length of the fourth note is 400 ms or 0.4 seconds. The tempo can be set in numbers, e.g., between 50 ... 999 bpm. The tempo is preferably set by selecting, from the menu, a tempo command in which case the desired tempo can be input onto the display through keys.

Figure 3:
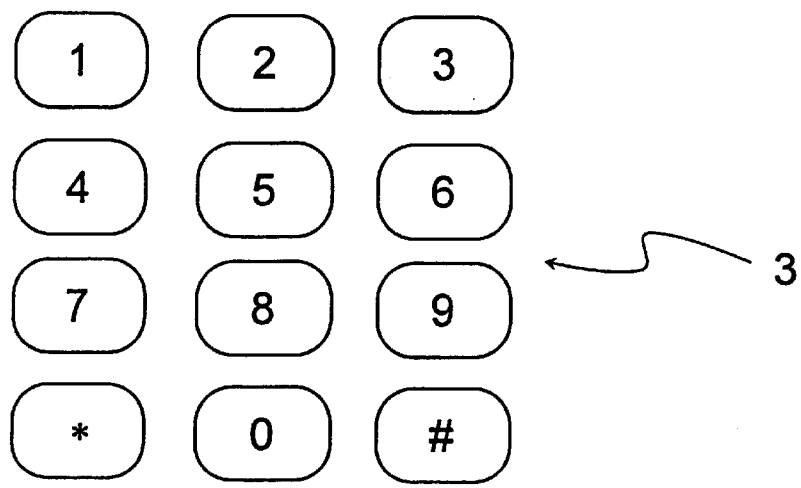
FIG. 3 illustrates a keyboard of an ordinary telephone and of a mobile phone.

In the following, a second embodiment of the invention will be discussed by referring to FIG. 3, which illustrates a keyboard 3 of a mobile station. In this embodiment, each tone (note or rest) can be produced through a specific key or as a combination of two keys. In this case, the pressing of one or two keys corresponds to a specific tone, whose corresponding note can be displayed on a stave on a display of the mobile station as a response to the pressing of the key, as presented above, or the tone can be reproduced, as a response to the pressing of the key, through a speaker of the mobile station, in which case a user can hear it. The duration of the pressing of the key or, in the case where two successive presses are executed, the duration of the latter press is proportional to the length of the tone. Tones can be produced through keys, e.g., in the following way (see FIG. 3):

c key 1
d key 2
e key 3
f key 4
g key 5
a key 6
h key 7
$c^1$ combination of keys* and 1
$d^1$ combination of keys* and 2
$e^1$ combination of keys* and 3
$f^1$ combination of keys* and 4
$g^1$ combination of keys* and 5
$a^1$ combination of keys* and 6
$h^1$ combination of keys* and 7
$c^2$ combination of keys# and 1
$d^2$ combination of keys# and 2
$e^2$ combination of keys# and 3
$f^2$ combination of keys# and 4
$g^2$ combination of keys# and 5
$a^2$ combination of keys# and 6
$h^2$ combination of keys# and 7

Sharp (cis, dis, eis, fis, gis, ais, his, $cis^1$, $dis^1$, ..., $cis^2$, $dis^2$, ..., $his^2$) and flat (ces, des, es, fes, ges, as, b, $ces^1$, $des^1, \ldots, ces^2, des^2, \ldots, b^2$) tones can also be produced. This can be implemented, so that of each of the tones produced in the manner presented above, a sharp or a flat tone is produced by adding, after each of the above mentioned presses or combination of presses, a press of the key # to produce a sharp tone, and a press of the key * to produce a flat tone. Thus, e.g., cis is produced through a combination of keys 1 and #, $dis^2$ through a combination of keys #, 2, and again #, and $fes^1$ through a combination of keys *, 4, and again *. Other kinds of key combinations can also be used. The idea is, however, that tones can be produced through an ordinary telephone keyboard. Naturally, an additional key, known to exist in mobile phones, can also be utilised. A rest can be produced, e.g., by pressing the key '0'. The duration of a tone can be arranged to be proportional to the time the key is kept pressed. For the tones, the selection of which presupposes two or three presses, the duration of the tone can be arranged to be proportional to the duration of the last press. The duration of a press can be indicated to the user, e.g., by reproducing beeps through the speaker, in which case, if a key is pressed until the hearing of the first beep, the length of an eighth note has been selected. If a key is pressed until the hearing of the second beep, the length of a fourth note has been selected. If a key is pressed until the hearing of the third beep, the length of a half note has been selected, and if a key is pressed until the hearing of the fourth beep, the length of a whole note has been selected. Similarly, the duration of a rest can be indicated, when the user presses the key '0'.

Figure 4:
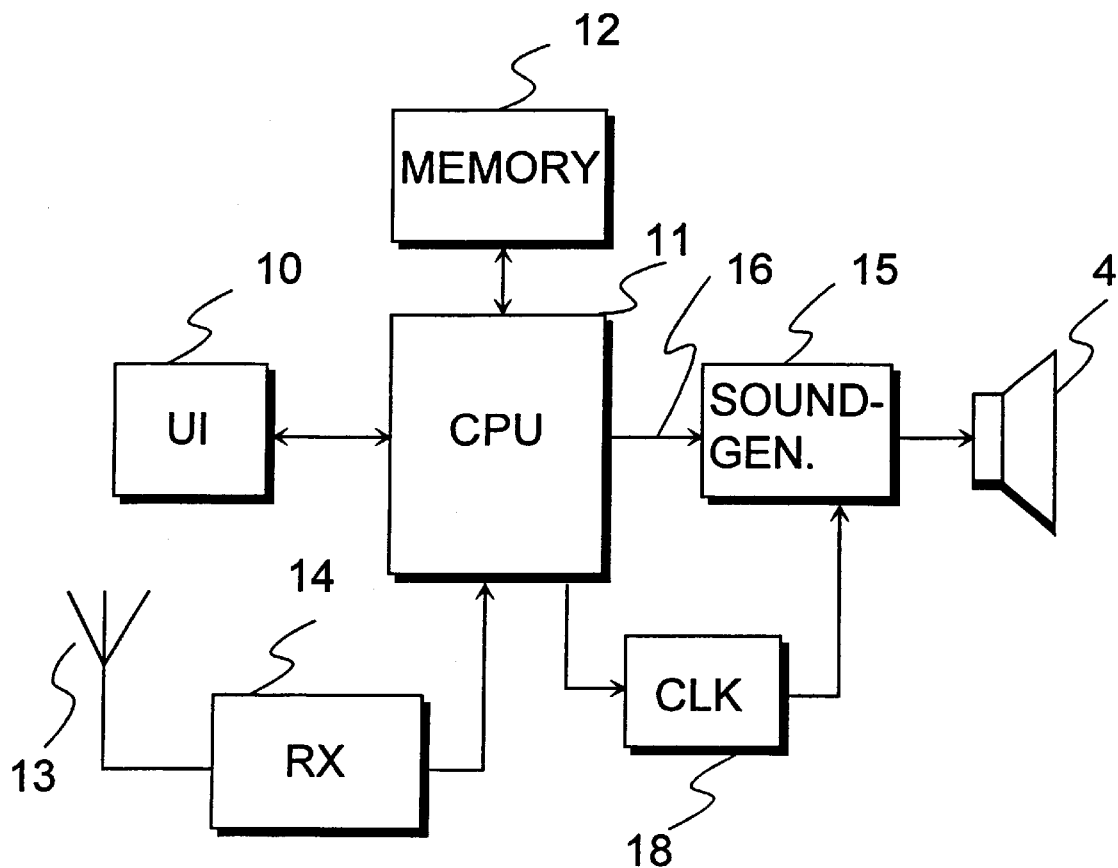
FIG. 4 is a block diagram of an arrangement in a mobile station for producing ringing tone according to the present invention.

FIG. 4 illustrates an arrangement for producing a ringing tone in a mobile station according to the present invention. From a user interface 10, which comprises a keyboard 3 and/or a display 2, tones (notes) selected by a user are received by a central unit 11 according to the first or second embodiment presented above, and stored in a memory 12 as a whole melody. The user interface 10 can also be an external user interface, which is coupled to the phone for inputting the ringing tone. A user interface of a phone can be implemented in a computer, which can be coupled to the mobile phone by means of a data card. When a call is coming in, according to the specifications of mobile phone systems, a message from a base station arrives first at the mobile station. This message is received from an antenna 13 to a receiver 14 of the mobile station, wherefrom the message arrives at the central unit 11. As a response to this, the central unit 11 gives a sound generator a control signal 16. On the basis of the control signal, the sound generator 15 generates the ringing tone, which is a sequence of sounds with a specific frequency based on the melody input by the user. The central unit 11 produces a control signal by reading, from the memory 12, the ringing tone stored therein. Thus, the control signal contains the information for the sound generator 15 defining what kind of ringing tone it should produce for a ringing tone reproduction device 4, which can be a buzzer, a speaker or some other transformer that transforms the electric signal into sound. When the user answers the phone by pressing an answering key, the user interface 10 gives a signal to the central unit 11 which, as a response to the pressing of the key, stops giving the sound generator the ringing tone control signal 16, whereupon the ringing tone stops.

As a sound generator 15, it is possible to use, e.g., a commercially available Codec ST5090 circuit, manufactured by SGS-Thomson, which includes a sound generator, which is capable of producing sounds between 15.6 Hz . . . 3,984 Hz at 15.6 Hz intervals, i.e., 256 sounds each having a different frequency. The sound frequency is produced on the basis of an 8-bit signal, which indicates a number between 0–256, in which case number 1 of the control signal corresponds to step 1 of the sound generator, i.e., to a frequency of 15.6 Hz and, correspondingly, number 2 corresponds to a frequency of 31.2 Hz, etc. The tones presented above can thus be reproduced as sounds, e.g., according to the following frequencies (not necessarily exact values, order of magnitude given) and by means of the following control signals (bytes), brought to the sound generator, of which some have been presented below and the rest can be concluded by persons skilled in the art according to the principle presented above: a=880 Hz corresponding to step 56 of the sound generator, i.e., control byte '00111000' (more accurately, 56×15.6 Hz=873.6 Hz), aid =932 Hz, b=988 Hz corresponding to step 63 of the sound generator, i.e., control byte '00111111' (more accurately, 63×15.6 Hz=982.8 Hz), $c^1$=1,047 Hz, $cis^1$=1,109 Hz, $d^1$=1,175 Hz, $dis^1$=1,245 Hz, $e^1$=1,319 Hz, $f^1$=1,397 Hz, $fis^1$=1,480 Hz, $g^1$=1,568 Hz, $a^1$=1,760 Hz, $ais^1$=1,865 Hz, $h^1$=1,976 Hz, $c^2$=2,093 Hz, $cis^2$=2,217 Hz, $d^2$=2,349 Hz, $dis^2$=2,489 Hz, $e^2$=2,637 Hz, $f^2$=2,793 Hz, $fis^2$=2,960 Hz, $g^2$=3,136 Hz, and $A^2$=3,520 Hz corresponding to the sound generator's step 226 or control byte '11100010' (more accurately, 226×15.6 Hz=3,525.6 Hz).

The frequencies corresponding to tones $c-a^2$ and to their raised and flattened tones, have preferably been pre-defined in the mobile station (or, at least, the tones necessary for producing the ringing tone), e.g., stored in the memory 12. One byte is stored in the memory 12 for each tone or sound to be produced, in which case, if the melody is formed of 60 tones, 60 bytes will be stored in the memory. The central unit 11 retrieves these bytes from the memory 12 and controls the sound generator 15 to produce the melody as the ringing tone. Said known codec circuit also has a clock entry and an internal clock signal generator which, in FIG. 4, has been illustrated as an off-line clock generator 18, which controls the operation of the sound generator 15 according to a specific clock tempo. This clock tempo can be fixed, so that the tempo of the sound generator is set to 150 bpm. Alternatively, as presented above, a tempo can be changed through the user interface. The set tempo is stored in the memory 12, and the sound generator 15 is controlled to generate sound at the set tempo on the basis of a signal it receives from the clock generator 18.

The central unit 11 identifies characters or pressing of keys executed by means of the user interface 10, and processes them to a frequency corresponding to the character or press of the key in question, and stores, in the memory 12, the signal corresponding to the frequency in question, which is taken to the sound generator 15, when the ringing tone is reproduced.

Another method for producing a control signal for the sound reproduction device 4 is to use, as the sound generator, a counter, e.g., a 16-bit counter, so that it counts downwards from 65,535 to 0. When a sound is produced, the counter is released to count downwards from a pre-set figure. When the counter reaches 0, a pulse is produced, and the counter re-begins to count downwards from a pre-set figure. A sound is formed of a number of pulses. The counter counts from 65,535 to 0 in 1/18 seconds, in which case, a pulse wave corresponding to 18 Hz is produced. If, in this case, 4,096 is given to the counter as the pre-set figure (in which case, it counts from 4,096 to 0), a pulse wave having a frequency of 65,535/4,096.18=288 Hz is produced. In this way, pulse waves with different frequencies between 18 Hz–1.18 MHz can be produced. Pulse waves, produced in this way, can be used as a pulse-width modulation to be input into a sound reproduction device, such as a buzzer, which vibrates according to the pulse wave.

The present invention allows a telephone user to produce a ringing tone to his/her liking and, in addition, the invention makes it possible to produce almost an unlimitedited number of different kinds of ringing tones. The invention can be applied to an ordinary telephone, a mobile phone or some other type of mobile station, wherein a ringing tone is required. By means of the invention, a ringing tone is produced, which is easily recognised and distinguished from the ringing tone of other phones. The first embodiment of the present invention makes it very easy and illustrative for the user to produce a ringing tone by means of either an ordinary mobile station's display or an enlarged display. In addition, the produced ringing tone can be modified. Furthermore, by means of the second embodiment presented, the ringing tone can be produced through a keyboard of an ordinary telephone. In neither case does the implementation of the invention presuppose external changes made to the telephone, hence, it is possible to implement the invention without increasing the size of the telephone.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

What is claimed is:

1. A telephone, which comprises a sound generator for generating a ringing tone as a response to an incoming call, a memory for storing a signal representing the ringing tone, means for retrieving the signal from the memory and for inputting the signal to the sound generator for generating the ringing tone, and sound reproduction means for reproducing the ringing tone generated by the sound generator, said telephone further comprising means for inputting information defining the ringing tone as characters, each character defining both pitch and duration of a tone, and further comprising a display and means for producing a stave on the display, and for inputting said characters on the stave.

2. A telephone according to claim 1, and further comprising means for inputting each character as a graphical symbol representing a note or a rest.

3. A telephone according to claim 1, and further comprising keys for using the telephone, and means for producing said characters as a response to the pressing of a specific combination of keys.

4. A telephone according to claim 1, and further comprising means for defining a ringing tone as a sequence of several of said characters.

5. A telephone according to claim 1, and further comprising a memory for storing a signal representing the input characters, and means for modifying the signal stored in the memory.

6. A telephone according to claim 1, and further comprising means for inputting information for programming a ringing tone.

7. A method for producing a ringing tone of a telephone wherein, as a response to an incoming call, a signal representing the ringing tone is retrieved from a memory, a ringing tone is generated, and the ringing tone is reproduced by means of sound reproduction means, wherein information defining the ringing tone is input as characters, each character defining both pitch and duration of a tone, and stored in the telephone's memory, wherein the characters are input by means of a user interface of the telephone, and p1 wherein a stave is produced on a display, and each character is input onto the stave as a graphical symbol representing a note or a rest.

8. A method according to claim 7, wherein the characters are input by means of the user interface coupled externally to the telephone.

9. A method according to claim 7, wherein information is inputted to the telephone for programming a ringing tone.

10. A telephone, which comprises a sound generator for generating a ringing tone as a response to an incoming call, a memory for storing a signal representing the ringing tone, means for retrieving the signal from the memory and for inputting the signal to the sound generator for generating the ringing tone, and sound reproduction means for reproducing the ringing tone generated by the sound generator, said telephone further comprising means for inputting information for programming a ringing tone by defining the ringing tone as a sequence of symbols, each symbol representing a note or a rest defining both pitch and duration of a tone.

11. A telephone according to claim 10, and further comprising a display for displaying said symbols as graphical symbols.

12. A telephone according to claim 10, and further comprising keys for using the telephone, and means for producing said symbols as a response to the pressing of a specific combination of keys.

13. A telephone according to claim 10, and further comprising a display and means for producing a stave on the display, and for inputting said symbols on the stave.

14. A telephone according to claim 10, and further comprising means for defining a tempo at which the programmed ringing tone is reproduced.

15. A telephone according to claim 10, and further comprising a memory for storing a signal representing the input symbols, and means for modifying the signal stored in the memory.

16. A telephone, which comprises a sound generator for generating a ringing tone as a response to an incoming call, a memory for storing a signal representing the ringing tone, means for retrieving the signal from the memory and for inputting the signal to the sound generator for generating the ringing tone, and sound reproduction means for reproducing the ringing tone generated by the sound generator, said telephone further comprising means for inputting information for programming a ringing tone by defining the ringing tone as a sequence of symbols, each symbol representing a note or a rest defining both pitch and duration of a tone and further comprising a display and keys, and a ringing tone programming menu, said menu having menu commands to be produced on said display for aiding the programming of a ringing tone by allowing selection of one of said menu commands with one of said keys.

17. A method for producing a ringing tone of a telephone wherein, as a response to an incoming call, a signal representing the ringing tone is retrieved from a memory, a ringing tone is generated, and the ringing tone is reproduced by means of sound reproduction means, wherein information defining the ringing tone is inputted to the telephone for programming a ringing tone by defining the ringing tone as a sequence of symbols, each symbol representing a note or a rest defining both pitch and duration of a tone, the programmed ringing tone is stored in the telephone's memory.

18. A method according to claim 17, wherein the symbols are input by means of a user interface of the telephone.

19. A method according to claim 18, wherein a stave is produced on a display, and each symbol is input onto a stave as a graphical symbol representing one of a note or a rest.

20. A method according to claim 17, wherein the symbols are input by means of a user interface to be coupled externally to the telephone.

21. A telephone, which comprises a sound generator for generating a ringing tone as a response to an incoming call, a memory for storing a signal representing the ringing tone, means for retrieving the signal from the memory and for inputting the signal to the sound generator for generating the ringing tone, and sound reproduction means for reproducing the ringing tone generated by the sound generator, said telephone further comprising a keypad with first keys 0 to 9, * and #, means for programming a ringing tone as a sequence of symbols representing notes or rests, where each symbol defines both pitch and duration of a tone, and means for inputting said symbols by pressing at least one of said first keys of said keypad.

22. A telephone according to claim 21, and further comprising keys for using the telephone, and means for producing said symbols as a response to the pressing of a specific combination of keys.

23. A telephone according to claim 21, and further comprising means for defining a tempo at which the programmed ringing tone is reproduced.

24. A telephone according to claim 21, and further comprising a memory for storing a signal representing the input symbols, and means for modifying the signal stored in the memory.

25. A telephone, which comprises a sound generator for generating a ringing tone as a response to an incoming call, a memory for storing a signal representing the ringing tone, means for retrieving the signal from the memory and for inputting the signal to the sound generator for generating the ringing tone, and sound reproduction means for reproducing the ringing tone generated by the sound generator, said telephone further comprising a keypad with first keys 0 to 9, * and #, means for programming a ringing tone as a sequence of symbols representing notes or rests and means for inputting said symbols by pressing at least one of said first keys of said keypad, and further comprising a display, a ringing tone programming menu, and said keypad further comprising second keys, said menu having menu commands to be produced on said display for aiding the programming of a ringing tone by allowing selection of one of said menu commands with one of said second keys.

26. A method for producing a ringing tone of a telephone wherein, as a response to an incoming call, a signal representing the ringing tone is retrieved from a memory, a ringing tone is generated, and the ringing tone is reproduced by means of sound reproduction means, wherein information defining the ringing tone is inputted to the telephone for programming a ringing tone as a sequence of symbols, representing notes or rests, where each symbol defines both pitch and duration of a tone, and inputting said symbols by pressing at least one of a key of the telephone keypad including keys 0 to 9, * and #.

27. A method according to claim 26, and further comprising defining a tempo at which the programmed ringing tone is reproduced.

28. A method for producing a ringing tone of a telephone wherein, as a response to an incoming call, a signal representing the ringing tone is retrieved from a memory, a ringing tone is generated, and the ringing tone is reproduced by means of sound reproduction means, wherein information defining the ringing tone is inputted to the telephone for programming a ringing tone as a sequence of symbols, representing notes or rests, and inputting said symbols by pressing at least one of a key of the telephone keypad including keys 0 to 9, * and #, and further comprising a ringing tone programming menu comprised of menu commands for programming the ringing tone by allowing selection of one menu command of the ringing tone programming menu produced on a display when the telephone is in a mode of allowing ringing tone programming.

29. A telephone, which comprises a sound generator for generating a ringing tone as a response to an incoming call, a memory for storing a signal representing the ringing tone, means for retrieving the signal from the memory and for inputting the signal to the sound generator for generating the ringing tone, and sound reproduction means for reproducing the ringing tone generated by the sound generator, said telephone further comprising a keypad with first keys 0 to 9, * and #, means for programming a ringing tone comprising a sequence of notes and rests, the means for programming comprising means for inputting symbols representing a respective one of said notes and rests by pressing at least one of said first keys of said keypad, wherein each note defines both pitch and duration of a tone.

30. A method for producing a ringing tone of a telephone wherein, as a response to an incoming call, a signal representing the ringing tone is retrieved from a memory, a ringing tone is generated, and the ringing tone is reproduced by means of sound reproduction means, wherein information defining the ringing tone is inputted to the telephone for programming a ringing tone as a sequence of symbols representing notes or rests of the ringing tone, and inputting symbols corresponding to a respective one of said notes and rests by pressing at least one of a key of the telephone keypad including keys 0 to 9, * and #, wherein each note symbol defines both pitch and duration of a tone.

* * * * *